United States Patent [19]

Woolford et al.

[11] Patent Number: 5,052,341

[45] Date of Patent: Oct. 1, 1991

[54] MILKING MACHINERY

[75] Inventors: Murray W. Woolford; Robert A. Sherlock; John H. Williamson, all of Hamilton, New Zealand

[73] Assignee: The Director General of the Ministry of Agriculture and Fisheries, Wellington, New Zealand

[21] Appl. No.: 320,927

[22] Filed: Mar. 8, 1989

Related U.S. Application Data

[63] Continuation of Ser. No. 924,934, Oct. 30, 1986, abandoned.

[30] Foreign Application Priority Data

Nov. 1, 1985 [NZ] New Zealand ..................... 212889
Aug. 20, 1986 [NZ] New Zealand ..................... 217300
Aug. 20, 1986 [NZ] New Zealand ..................... 217301

[51] Int. Cl.[5] .............................................. A01J 3/00
[52] U.S. Cl. .............................. 119/14.02; 119/14.17
[58] Field of Search ............. 119/14.02, 14.03, 14.04, 119/14.15, 14.16, 14.17, 14.47

[56] References Cited

U.S. PATENT DOCUMENTS

| | | | |
|---|---|---|---|
| 2,680,445 | 6/1954 | Hemminger | 119/14.03 |
| 2,808,025 | 10/1957 | Graves | 119/14.17 |
| 3,122,149 | 2/1964 | Hauk et al. | 119/14.02 |
| 3,204,607 | 9/1965 | Arnold et al. | 119/51.11 |
| 3,373,720 | 3/1968 | Duncan | 119/14.02 |
| 3,919,975 | 11/1975 | Duncan | 119/14.05 |
| 4,198,999 | 4/1980 | Boudreau | 119/14.02 |

Primary Examiner—Gene Mancene
Assistant Examiner—R. Thomas Price
Attorney, Agent, or Firm—Blakely, Sokoloff, Taylor & Zafman

[57] ABSTRACT

Apparatus for use in the machine milking of animals including a chamber which is connectable to the teat cups of a milking machine. A sensing arrangement associated with the chamber permits the volume of milk within the chamber to be sensed and control equipment is coupled with the sensing arrangement so as to be operable in response to a determined volume of milk within the chamber being sensed. A valve is operable in response to the control equipment. Accordingly, the apparatus can be connected to a milk transport system to enable milk to pass from the chamber through the valve and into the milk transport system.

19 Claims, 4 Drawing Sheets

MILKING MACHINERY

This is a continuation of application Ser. No. 924,934 filed Oct. 30, 1986 now abandoned.

This invention relates to a method and means for the machine milking of animals.

Most modern machine milking systems for animals such as cows, sheep and goats utilise a double action two-chambered teatcup to remove milk from the teat of the animal. Milk from the teatcup is then transported by various means to a milk collecting vessel. Several well defined configurations of the associated pipes, tubes, collecting vessels and pumps are in common use. The most important of these are:

'Bucket' milkers which use a small milk collection vessel located at or adjacent the claw, with relatively short tubes connecting it to the teatcups. Such a system is generally used only to milk small numbers of cows.

'Recorder jar' milking systems, where the milk from each cow is collected in a vessel located in the bail unit. Such a system is usually used for yield measurement. At the completion of milking of each cow the content of the jar is transported via a milk pipe to a remote holding vat.

'Pipeline milkers' which do not use an intermediate collection vessel for the milk from each cow but transport it via a common pipeline, receiver vessel and pump direct to a milk storage vat. Many milking units may feed into the common pipeline. Such pipeline milkers are commonly used for milking batches of cows and are thus generally associated with a high milking throughput in terms of cows milked per hour.

The present invention is particularly concerned with the method of milk transport within the vacuum system of the milking machine from the teatcups via the intermediate tubes and pipes to the milk receiver vessel.

Such transportation often requires (particularly in pipeline milkers) elevation of the milk flow to a pipeline or vessel at a higher level. The design of most current milking machines is such that milk transport within the vacuum system is achieved by allowing a controlled level of air to flow through the milk. The milk is thus essentially carried along by an air flow. The air is usually admitted via a small aperture at the claw-piece of each teatcup cluster. This inflow is typically 0.25 liters/second.

During the main milk flow phase of milking the volumetric air flow is typically 10–20 times the volumetric milk flow. Agitation which takes place within this two phase flow results in significant frothing and foaming of the milk, and a substantial level of air also becomes entrained within it in the form of small bubbles. Fresh milk is well known to be highly susceptible to froth and foam formation, this being a consequence of protein components which tend to stabilize air-milk interfaces generated by the turbulent air/milk motions. In pipeline milking systems milk is often transported over considerable distances (perhaps 30 m) and this can result in considerable accumulations of froth in milk receiver vessels.

This method of generating milk flow, while being a simple means of achieving milk transport within a vacuum system has serious disadvantages, particularly in pipeline milking machines. Major problems arising from this two-phase system of milk transport are:

(i) Air entrainment in the milk, frothing and foaming degrades milk quality through lypolysis, (enzyme induced generation of free fatty acids following mechanical rupture of the fat globule membrane which generates undesirable flavours). Churning or fat aggregation may also occur.

(ii) Froth and entrained air in milk often impairs the efficiency of milk pumping devices in the farm dairy, especially those pumps of centrifugal design.

(iii) Air drawn into the milk at the cluster for purposes of achieving milk transport may directly contaminate milk with environmental bacteria, fungi or other material since the air is usually drawn from the immediate environment of the milking shed, which has high levels of such contaminants.

(iv) Vacuum control and regulation at the teatcup is degraded since vacuum reticulation is via the milk flow path. The attendant vacuum loss significantly reduces milking rates and can then cause cup slippage and cluster falls.

(v) Serious difficulties arise in metering milk yield and flow rates within two-phase air-milk flows.

(vi) Vacuum fluctuations at the teat resulting from inefficient vacuum control via the milk flow path, are associated with an increased risk of intramammary infection.

Attempts have been made in the past to overcome these problems by separating the vacuum reticulation system from the milk transport process. Such systems have typically utilized float valve mechanisms located within or near the claw-piece of the milking machine to allow the milk to be drawn away into a separate piping system. Milk removal has been achieved either by a scavenging pump or by maintaining a vacuum difference across the milk removal valve. In this way milk is separated from air flows within the milking machine and is essentially transported away from the cow as a single phase liquid flow. Such known valving mechanisms used for air-milk separation have, however, been inefficient mechanically and have given relatively poor separation performance.

It is the object of the present invention to improve the efficiency of air-milk separation in machine milking of animals.

Broadly in one aspect of the present invention there is provided an apparatus for use in the machine milking of animals comprising a milking receiving chamber connectable to the teat cups of a milking machine and connectable to a milking vacuum source, sensing means associated with said chamber said sensing means, during milking of an animal, sensing a presence of a volume of milk equal to or greater than a predetermined volume, a milk outlet through which milk from the milk receiving chamber can flow into evacuated milk transport means, valve means which is operative between open and closed positions to control milk flow through or from said milk outlet and control means for controlling the opening and closing of said valve means, the control means being operative to close the valve means each time said sensing means senses a reduction to said predetermined volume and operative to open said valve means when, following closure of the valve means the milk contained within the chamber has increased to a volume greater than said predetermined volume.

According to a second broad aspect of the invention there is provided an apparatus for machine milking an animal comprising a teat cup cluster coupled to a milk receiving chamber, a milking vacuum means connected via a claw vacuum line to said chamber, said chamber being connected with evacuated milk transport means, said milk transport means being separate from said vacuum milking means, sensing means associated with said chamber said sensing means, during milking of an animal, sensing a presence of a volume of milk equal to or greater than a predetermined volume, a milk outlet through which milk from the milk receiving chamber can flow into a milk transport means, valve means which is operative between open and closed positions to control milk flow through or from said milk outlet and control means for controlling the opening and closing of said valve means, the control means being operative to close the valve means each time said sensing means senses a reduction to said predetermined volume and operative to open said valve means when, following closure of the valve means the milk contained within the chamber has increased to a volume greater than said predetermined volume.

In the following more detailed description of the invention and its various embodiments reference will be made to the accompanying drawings in which.

According to the invention in its broadest form there is provided apparatus for sensing a volume of milk, removed from an animal by a milking vacuum system, in a holding chamber and then controlling by control means a valving means thereby permitting the milk to flow through valving means into a separate milk transport system when a determined volume or level of milk within the chamber has been sensed by sensing means. This apparatus can be located within the milking machinery at an appropriate location. However, in the form of the invention to now be described the apparatus forms part of a claw piece of a teat cup cluster.

In a preferred form the sensing means is a two or three electrode conductivity sensor located within the bowl of the claw. The sensor has a geometry which minimises the effect of inter-electrode conduction through milk films which spread over the surfaces between electrodes. The geometry is configured so as to give a large change in inter-electrode conductance when the milk accumulated in the bowl exceeds a volume, typically 200 ml.

Figure 1:
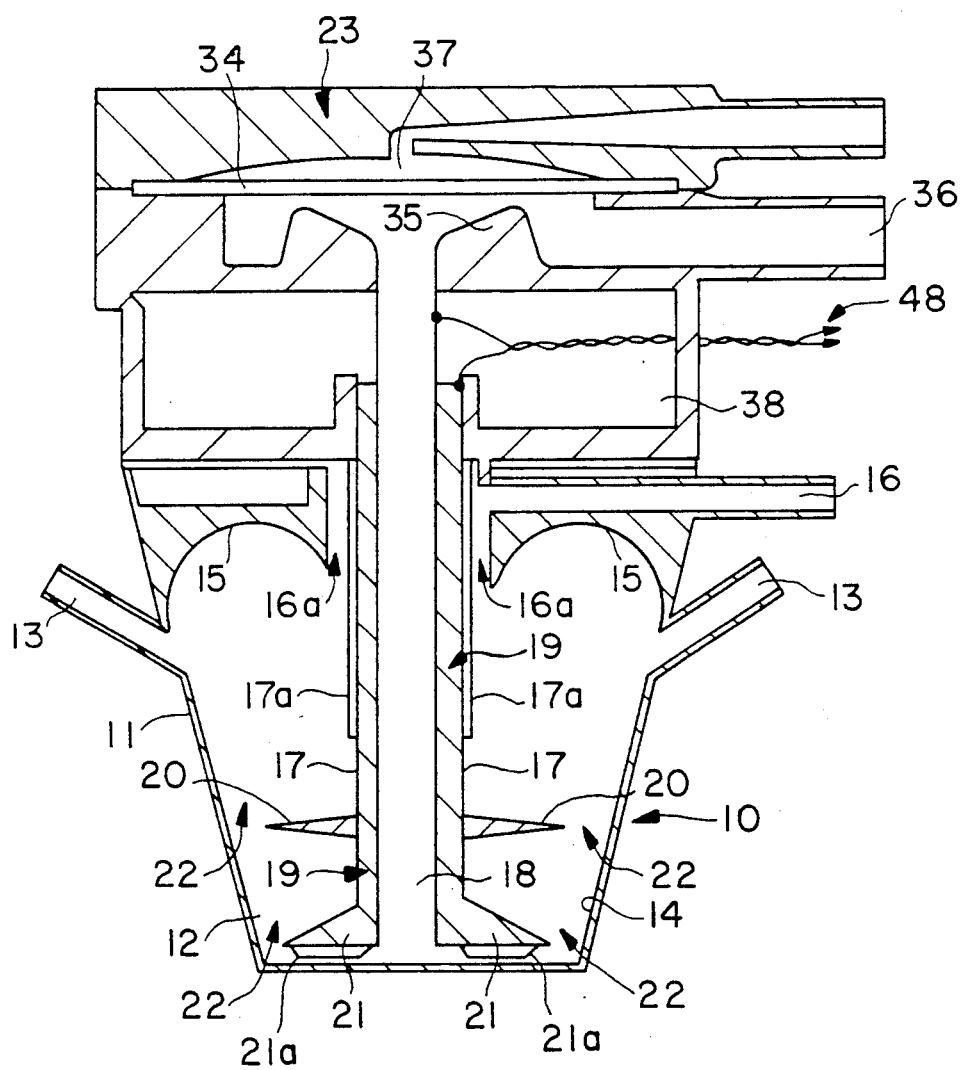
FIG. 1 is a cross-sectional view of a claw piece embodying the invention.

Referring to FIG. 1 there is shown a claw piece 10 having a bowl 11 which defines therein a milk receiving chamber 12. Milk tubes (not shown) from the teat cups are attached to bowl 11 via nipples 13 and preferably the nipples 13 are positioned so as to be tangential such that swirling action of the incoming milk over the internal surfaces 14 and 15 of the chamber 12 is achieved. This action minimises froth and bubble formation.

The swirling action of the milk in the bowl 11 is undesirable at the intake to tube 18. Extreme cyclonic rotation of outflowing milk results in cavitation which partially obstructs the flow cross-section of milk tube 18, particularly in the vicinity of the intake. Accordingly a set of vanes or baffles 21a are preferably attached to the underside of a spreader 21. These vanes or baffles are radially disposed and serve to prevent hydrodynamic rotation of the outflowing milk as it approaches the mouth of pipe 18.

Milking vacuum is connected to claw 10 via nipple 16 and an annular space 16a which is concentric to the electrode arrangement (to be hereinafter described). It will be appreciated by those skilled in the art that FIG. 1 omits, in the interests of clarity, details of the pulsator manifold whereby pulsation vacuum levels are transmitted from a pulsator unit to the teatcups connected to the claw.

The swirling action of the incoming milk over surfaces 14 and 15 acts as a cyclone which keeps the milk movement clear of the aforementioned annular space 16a. Preferably the upper surface 15 is radiused as shown so as to allow the milk swirl to extend over a smooth surface in the upper region of chamber 12.

The geometry of an embodiment utilizing two electrodes is shown in FIG. 1. The electrodes are preferably two coaxial metal tubes 17 and 18 with the inner tube 18 serving as a milk removal tube, as will hereinafter be described.

An insulating structure shown generally at 19 separates the electrode tubes 17 and 18. This structure 19 preferably has integrally formed with it one or more horizontally disposed circular surfaces (spreaders) 20 and 21 which form an annular space 22 between their extremities and the inner surface 14 of bowl 11.

In this way the inter-electrode surface distance between electrodes 17 and 18 is substantially increased so diminishing the relative contribution of surface milk films to the total inter-electrode conductance. Further, the annular space 22 may be decreased to the point (typically 5 mm) where the inter-electrode conductance is determined largely by the conductance component through these annular cross-sections.

The geometry is therefore such that when the milk level in bowl 11 falls to the point where the annular space 22 is no longer milk filled, a very substantial decrease in inter-electrode conductance occurs. Similarly when bowl 11 fills with milk the inter-electrode conductance increases abruptly (typically by a factor of 30) once both annular spaces 22 have become filled with milk and the upper surface of spreader 20 is milk covered. The arrangement gives very positive electrical differentiation between the situations where the bowl is filled above and below the upper spreader 20 and is quite insensitive to milk froth or films on the insulating surfaces 19.

For the preferred sensor means shown in FIG. 1 the upper milk level can be as high as the bottom of the milk entry tubes. The lower level must not be significantly below the top of the upper spreader to minimise the chance of larger bubbles being drawn into the milk intake pipe.

Maintenance of the milk level in this range is achieved by closing a milk valve 23 with minimal delay (eg in less than 0.1 sec) whenever the sensor system indicates a liquid covered to no-liquid covered transition, and subsequently opening the milk valve after a time delay Td following a no-liquid to liquid transition. This also provides built-in hysteresis which is essential to avoid "chatter" or high speed flutter in the milk valve. In simple implementations, Td may be constant (approx. 1 sec) but is preferably adjusted dynamically by the electronic control system to suite the milking rate (eg at low milking rates the delay may be longer, thus reducing the number of milk valve operations).

An additional insulating sleeve 17a covering the surface of the outer electrode 17 is provided, such that a defined electrode surface area proximal to spreader 20 is in contact with the milk, which allows an absolute measurement of milk conductivity to be made. This is of assistance in compensating for the effects on the conductivity on the milk level sensing in bowl 11.

A further useful modification which reduces the penetration of air bubbles or froth to the intake of milk tube 18 is to control the milking pulsator such that the teat cup liner does not collapse while the milk valve 23 is open and milk outflow from bowl 11 is taking place. It is envisaged that a non-return valve relative to the inlet nipple would also be advantageous in order to reduce air entrainment at the introduction of milk into bowl 11.

The milk flow rate can be estimated by the fraction of time the milk valve is open since the volume flow rate from the claw is well defined by the approximately constant vacuum differential (Vu−Vm). This flow rate estimate is sufficiently accurate to provide the adaptive variation of Td as discussed above and to detect the end-of-milking to actuate the vacuum cut-off valve 55 and a teatcup removal system. It is sufficiently accurate to provide a yield ranking measurement between cows so their relative performance can be monitored in successive milkings and relative to their herd mates.

Figure 2:
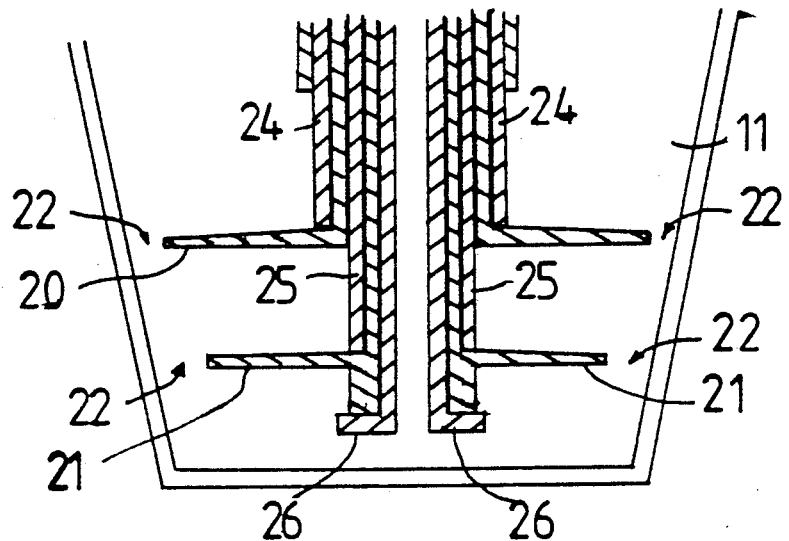
FIG. 2 is a detailed cross sectional view of part of the claw piece of FIG. 1 but showing a modified arrangement.

A further variation to provide a coaxial three electrode arrangement is shown in FIG. 2. In this case three electrodes 24, 25 and 26 are used to distinguish between the two milk levels within the claw bowl defined by the insulating spreaders 20 and 21.

Liquid level changes at spreader levels 20 and 21 generate abrupt conductance changes between electrode pairs 24, 25 and 25, 26 respectively.

This arrangement thus allows bowl fill to be maintained between two levels defined by the vertical location of the spreaders 20 and 21.

Variations in the electrical techniques of the sensing means may be used for level detection in the claw bowl. In particular, capacitive elements in the previously described embodiments.

This may, for example, be achieved with the two electrode coaxial form shown in FIG. 1 by covering the metallic surfaces within a thin insulating film.

The resultant arrangement then has the equivalent circuit shown below.

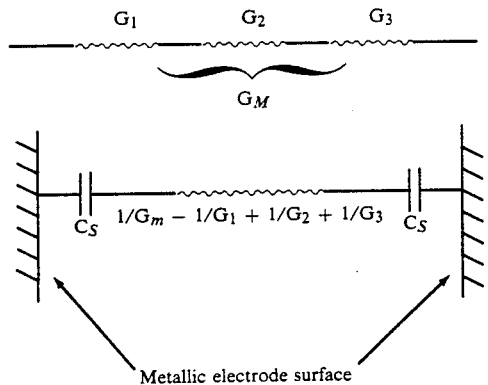

Capacitances $C_S$ are formed by the insulating layer over the electrode surfaces and conductance $G_M$ represents the electrical path through the milk. $G_M$ can be considered as three separate series components $G_1$, $G_2$ and $G_3$ as indicated. $G_1$ and $G_3$ are the conductances in the annular regions around the upper (20) and lower (21) spreaders respectively and $G_2$ is the much larger conductance of the milk between the spreaders. In particular $G_M$ varies substantially with milk level in bowl 11 due to changes in $G_1$ at the annular space 22 surrounding the upper spreader.

Therefore, a more general description of the preferred electrode arrangement can be stated to consist of a set of conductors (which are preferably coaxial) configured with insulating partitions such that the interelectrode impedance varies rapidly with milk level in bowl 11 and is relatively insensitive to surface milk films and froth.

Apart from ease of fabrication, the coaxial geometry allows good vortex milk flow pattern within the bowl to be achieved and this is desirable in the upper region of the bowl 11 for purposes of effective air-milk separation. The previously mentioned vanes or baffles incorporated in or around the lower spreader 21 prevents the vortex flow persisting in the milk tube 18.

Figure 3:
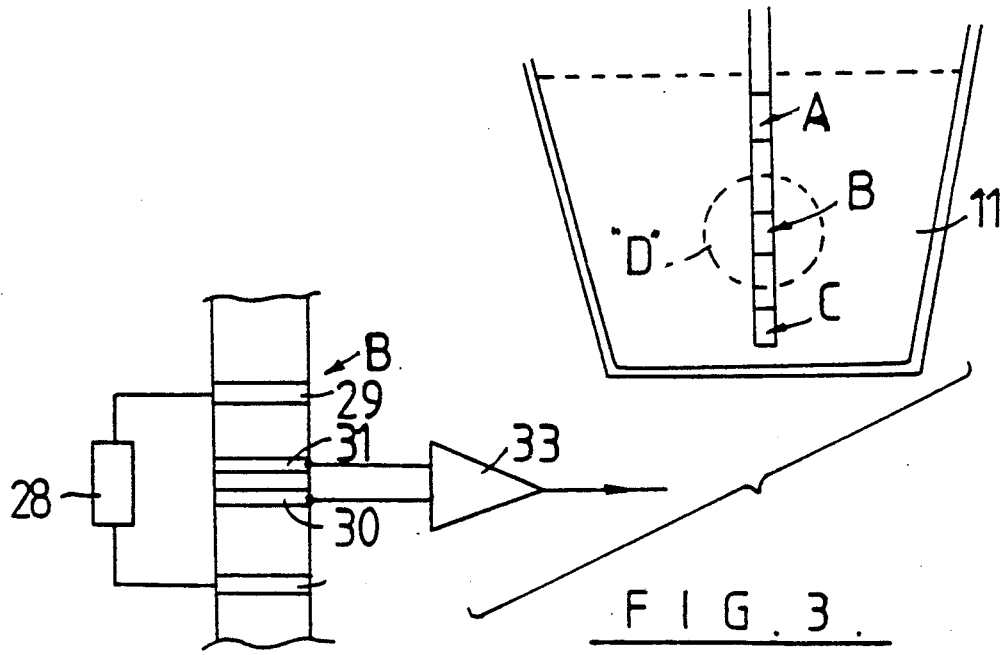
FIG. 3 is a similar view to FIG. 2 but showing yet a further embodiment of sensing means.

The invention is open to modification and thus other electrode configurations are possible which use milk conductivity as the specific sensing means. In particular, rather than using a bulk milk conductance approach as in the preferred arrangements illustrated in FIGS. 1 and 2 a localised single point or multiple point sensing method can be used. FIG. 3 shows one such arrangement where the local conductivity is determined at three different depths A, B and C within bowl 11.

In this particular arrangement at each measuring depth a four terminal network is used (shown enlarged in the details of "D") to measure the local conductivity and so differentiate the presence of liquid milk from foam, froth or no liquid milk. A constant current source 28 drives an alternating current between electrodes 29 and 30 this being substantially independent of the milk conductivity and electrode contact impedance.

A pair of closely spaced sensing electrodes 31 and 32 are connected to an amplifier 33 having a high impedance balanced input. The rectified output voltage of amplifier 33 is a measure of the conductivity of the milk in the immediate vicinity of the measuring point and is insensitive to variations in electrode surface characteristics.

The multiple point system shown in FIG. 3 allows the conductivity to be compared at two levels A and B to distinguish between liquid milk and foam or froth. Alternatively a third point C, always immersed in the milk may be utilised to provide a reference conductivity of the milk for measurements at levels A and B.

The milk removal valve 23 is then controlled such that bowl 11 fills and empties between levels A and B. This obviates the need for electrically introduced level hysteresis as in the two-terminal coaxial geometry of FIG. 1 but is a more complicated structure to manufacture.

According to yet further embodiments of the sensing arrangement the sensor may comprise optical, thermal, acoustic (ultrasonic) or other liquid sensing means. It may provide level indication at a single level at a series of levels or over a spatially continuous range.

Milk is as previously described withdrawn from bowl 11 via electrode tube 18 through control valve 23 comprising diaphragm 34 which closes onto seat 35. Milk then passes from nipple 36 via a tubing system to a milk collection vessel or pump. Milk outflow may be generated by maintaining a pressure at nipple 36 below (typically by 20–25 kPa) that pertaining within bowl 11.

Valve 23 is opened and closed by applying an appropriate pressure to control chamber 37. When atmospheric pressure is applied to chamber 37 diaphragm 34 closes onto annular seat 35 and the valve is closed. When a pressure lower than that within the milk transport system (ie that within milk port 36) is applied to chamber 37 the valve opens.

The valve assembly 23 may be either located as an integral part of the claw as shown in FIG. 1 or it may be positioned remotely off-claw on a milk pipe or tube. In this latter case electrode tube 18 is simply connected via nipple 36 to the remote milk control valve located perhaps 1–2 m distance of a milk flow pipe serving multiple bail positions.

As an alternative to the valve arrangement shown in FIG. 1 there may be used, for example, a small electromagnetic valve.

A space 38 (see FIG. 1) is interposed between the bowl 11 and milk valve 23. This may contain control electronics and-or connections associated with the electrode assembly.

Not shown in FIG. 1 and as previously mentioned is a manifold located within space 38 which supplies the pulsation from an external connection to the four teat-cups.

Figure 4:
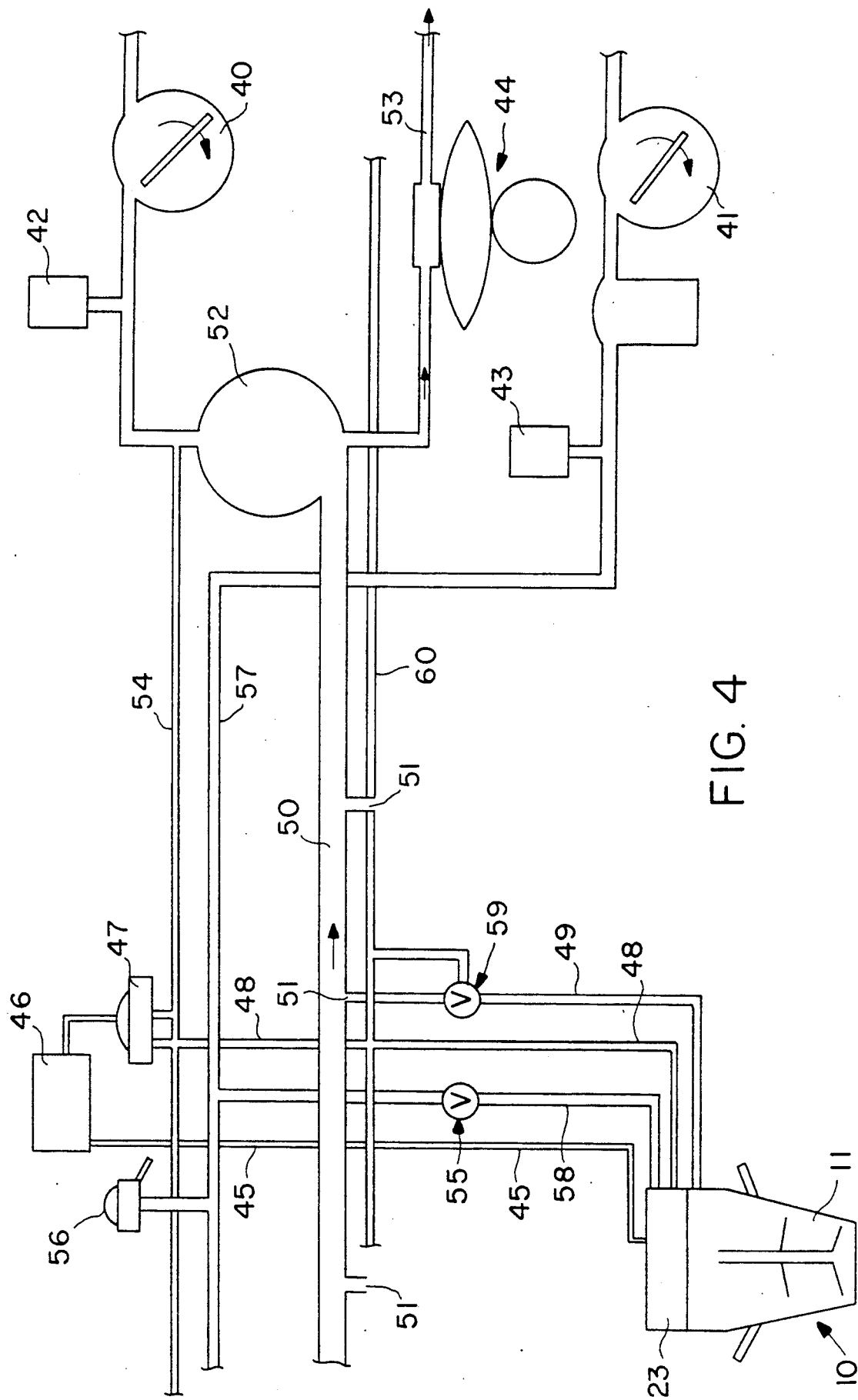
FIG. 4 is a layout of a milking machine embodying the invention.

One preferred arrangement of a complete milking system employing the present invention is shown in FIG. 4. In this arrangement two vacuum pumps 40 and 41 are used. Pump 40 holds the milk transport system at a higher vacuum level Vu (typically 60–80-kPa) than that maintained in the milking vacuum system Vm by pump 41 (typically 40–50 kPa) by way of the settings of vacuum regulators 42 and 43 respectively. Such differential vacuum systems are known.

Milk pump 44 is a valved pump (eg a conventional motor driven or pneumatically driven diaphragm pump) so as to achieve release of milk from the vacuum system and delivery into a collector vessel at atmospheric pressure.

In FIG. 4 the milk sensing electrode assembly within the claw 10 is connected via cable 45 to an electronic control module 46. Electromagnetic control valve 47 is activated by the electronic module 46 and is connected to the pneumatic milk control valve in claw 10 by control tube 48.

Milk valve 23 of claw 10 is preferably a pneumatically controlled diaphragm valve as previously described. When control tube 48 is switched to atmospheric pressure by valve 47 (though actuation may also be achieved by an on-claw device as previously discussed) the control valve 23 is held closed. When the milk level in bowl 11 rises above an upper threshold level, the abrupt change in inter-electrode impedance causes the electronics module 46 to activate valve 47. This switches control tube 48 to the milk transport vacuum level Vu (normally 60–80-kPa) and hence opens milk valve 23.

The vacuum differential (Vu−Vm) between the milking vacuum and the milk system vacuum causes milk to flow out of the valve 23 via tube 49 (which is coupled to nipple 36) to pipeline 50. Other milking units may also feed to this pipeline via similar inlets 51. An intermediate tank 52 may be used as a buffering collection volume from which milk is extracted by milk pump 44 and discharged via delivery pipe 53.

Milk pipeline 50 may enter the bottom of tank 52, as shown in which case if it has an upslope towards tank 52 it may be maintained essentially airfree. However, milk pipeline 50 may also slope downwardly to tank 52 and may enter the top of the tank. This gives drainage of pipe 50 to tank 52 and prevents air entering tank 52 from pipe 50 from moving into the body of milk in the tank. Further advantage is obtained in the latter case by allowing milk entering tank 52 to spread over a surface sloping down into the tank. This minimising air entrainment.

The milk system vacuum Vu level is reticulated to other control valves 46 (there is one such valve per claw) via pipe 54.

A pneumatic valve 55 operated by an electrical solenoid or other electrical means (not shown), preferably controlled by the electronic module 46 may be used to disconnect the milking vacuum supply from the claw 10. This may also form the vacuum cut-off means for automatic cup remover systems.

Milk metering devices or flow sensors or sampling devices may be connected in the milk tube 49 or be incorporated in the claw and may find design advantages from the substantially liquid phase flow within the milk flow system.

A valve 59 may be interposed in the milk tube 49 to allow the milk from individual cows to be transferred into a separate milk delivery line 60, however a more detailed description of an arrangement for collection of waste milk follows.

Figure 5:
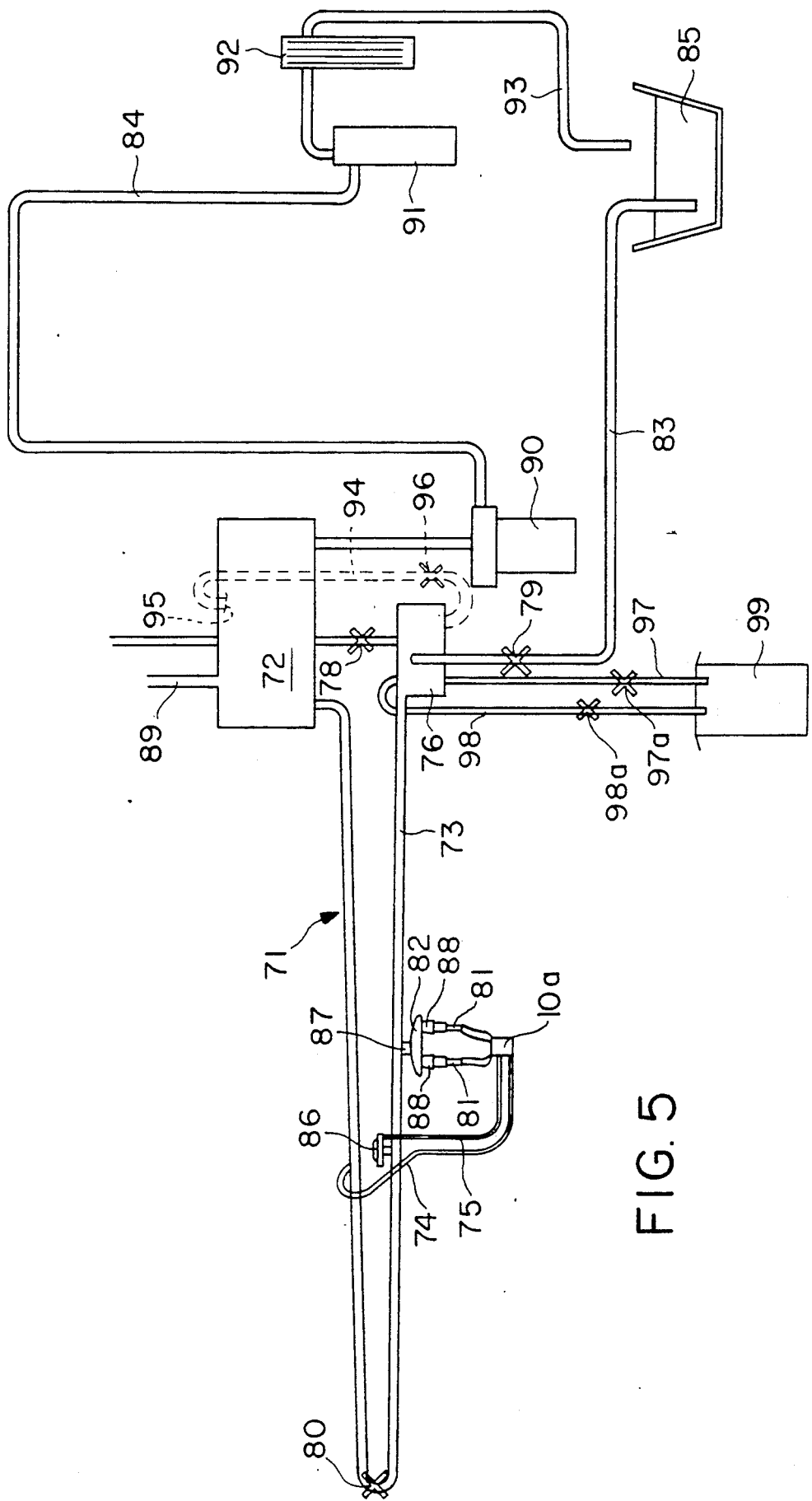
FIG. 5 is a modified layout of the milking machine showing a means of collecting waste milk, and when further modified as shown in dotted detail to provide a means of washing the machine.

Referring now to FIG. 5 the milking machine illustrated is shown in an alternative form and to avoid confusion; different references numerals are employed. The milk transport system consists of a milk pipe line 71 connected to a milk receiver 72. Milk accordingly flows away from the cow via pipeline 71 to receiver 72 and then via a pump which is coupled to a milking vacuum source (not shown).

If milk is to be excluded from the normal milk transport system due to antibiotic or colostrum contamination this is achieved by implementing via the micro computer control a particular milk mode wherein the teat cups 81 are applied to the cow with the claw vacuum valve being open with the milk valve 23 in the claw 10a being held closed throughout milking. As a consequence the claw 10a and claw vacuum tube 75 is caused to be flooded with milk with the result that the milk flows via claw vacuum pipe 73 to trap 76.

Coupled to trap 76 is a waste milk container or reservoir 99 such connection being via lines 97 and 98 in which are situated valves 97a and 98a. In the waste milk mode valves 97a and 98a are in the open position hence waste milk flowing into the trap 76 drains into the reservoir 99 which has a vacuum reticulated to it via tube 98 from the top of trap 76. The reservoir 99 can be emptied or removed at any time during milking by closing valves 97a and 98a and removing the lid or otherwise venting the vessel to atmospheric pressure.

As an alternative arrangement the waste milk could be released from trap 76 or reservoir 99 with an appropriate pump and pipe to a remote reservoir.

Whilst milk flow in pipe 73 may generate vacuum variations at neighbouring teat cup clusters also connected to the milk vacuum pipe 73 but which are operating in a normal milking mode it is believed that provided pipe 73 is appropriate sized this will not cause any serious complication when compared to the convenience of being able to readily divert waste milk to the reservoir 99.

Milking vacuum pipe 73 thus has three functions, the first being in the normal milk mode to reticulate the milking vacuum, the second to act as a path for waste milk as previously described and third to act as a jetter line to reticulate wash water as hereinafter described.

There is thus no need, as with conventional milking machines to attach individual traps to bail units when waste milk needs to be discarded. A single central reservoir 99 collects all the waste milk and all that is required by an operator (involved at the particular bail in which a cow whole milk is to be withheld) is to implement the waste milk mode which causes the particular bail micro computer unit to set valves 86 and 23 in the appropriate settings before the teat cups are attached. The valves 97a and 98a are opened either manually or by a central computer system.

In effect when the waste milk mode is selected the system operates, relative to the cluster for which the selection is made, as a conventional milking machine with the milking vacuum and milk flow being via a single vacuum system, i.e. via claw pipe 73. The actual milk flow action in the tube 75 is effectively one of two possibilities depending on where the air admission hole to tube 75 is located. If the air admission hole is located at the lower extremity of tube 75 or in claw 10a (as is normal practise in conventional milking machines) this subsidiary milk flow path acts exactly as does a conventional milking system with a 2-phase flow of air and milk. If however, the inlet hole is located at the upper extremity of tube 75 then in the waste milk mode claw 10a and tube 75 will fill with milk and an hydraulic milking action is created.

Referring now to the dotted detail in FIG. 5 a modification of the milking machine is shown whereby washing of the machine can be carried out.

To prepare the machine for washing the claw-vacuum supply is disconnected by operating valve 78. The high vacuum supply remains connected via pipe 89 to milk receiver 72 though it is envisaged that in some circumstances the vacuum level may be reduced for washing. The teat cups 81 are then attached to the jetter units 82 which are mounted on the claw-vacuum pipe 73 via a non-return valve 87. This non-return valve permits the flow of cleaning fluids from pipe 73 (as will hereinafter be described) into the jetter units 82, however, in the normal milking mode the non-return valve is drawn closed by the claw-vacuum within pipe 73.

To enable the teat cups 81 to be connected to the jetter units 82 a vacuum supply must exist at the claw 10a. This is achieved by reticulating the milk transport vacuum to the claw 10a and hence to the teat cups 81. This is achieved by opening the pneumatic valve 86 located on the claw-vacuum pipe 73 and also opening the pneumatic milk valve in the claw. The effect of the opening of these valves is to reticulate the milk transport vacuum to pipe 73 and hence trap 76.

To introduce washing water to the system control valve 79 in pipe 83 leading from reservoir 85 is opened and this enables water or detergents/sanitisers to be drawn from the reservoir and into the plumbing of the milking machine by the vacuum pertaining therein. The flow path for the washing fluid is via trap 76 along claw-pipe 73 through non-return valve 87 into jetter 82, teat cups 81 and then to the bowl of the claw. There is, however, also a parallel flow path from claw-vacuum pipe 73 via the pneumatic valve 86 down the claw vacuum tube 75 and into the claw 10a. This flow into the claw takes place via a suitable nipple (not shown).

From the bowl of the claw the cleaning fluids arriving from both these paths flow via milk intake tube 18a, the claw milk valve 23 and long tube 74 to the milk transport pipe 71, and then into the milk receiver 72. From the milk receiver 72 the fluid is withdrawn by the milk pump 90 and delivered via pipe 84 usually to a milk filter 91 and plate cooler 92 and via pipe 93 to resevoir 85 or alternatively is permitted to run to waste. The cleaning fluids may be left to recirculate through the system from reservoir 85. A valve 80 coupling the extreme end of the milk transport pipe 71 and claw vacuum pipe 73 may be briefly opened and closed to facilitate washing of the extremities of these pipes.

Milk receiver 72 being a large vessel may require additional cleaning fluid dispersal to its internal extremities. This may be achieved by connecting a small bore tube 94 from the floor of trap 76, to reticulate the washing water to the jetter units 82. This obviates the need for a third pipe to supply wash water to the jetters. This additional pipe is a common feature of other systems. The washing system thus employs the existing vacuum system plumbing with the only additional plumbing being pipe 83 the only additional components being the jetters 82 mounted on the claw-vacuum pipe 73.

The washing system provides an extremely effective means of washing the milking machine as the entire vacuum system of the machine which is likely to come into contact with milk, whether actually transporting milk or reticulating the claw vacuum supply, is washed. This is achieved without the need for any additional pumps and with the minimum of additional components. It is envisaged that the operation of the valves employed to operate the washing system, namely, valves 78, 79, 80 and 86 may be electrically controlled so as to automate the set up of the washing mode and recirculation of the cleaning fluid. The setting up of the system into the washing mode could also incorporate the electrical control of hot/cold water input to the reservoir 85 and the measured addition of cleaning materials to the reservoir 85 or indeed into the supply line 83. Alternatively all this can be achieved by manual means.

The configuration shown in FIG. 4 is only one possible layout of the milking machine components. Either the electronic module 46 or the control valve 47 or both could be located within the upper-structure of the claw 10. This is possible through the level of miniaturization which is now possible with modern electronic integrated circuits and where the electromagnetic control valve 47 can be made very small.

As an alternative arrangement, the milk valve may be moved to a location remote from the claw to become integral with the electronics module 46 and possibly located on the milk pipeline 50. Operation of the system in both these variant configurations is otherwise the same as previously described.

Both variations have the advantage of reducing the number of tubes required to connect the individual claw units to the milk pipe system servicing the total milking unit.

Not shown in the layout of FIG. 4 are the arrangements for pulsation reticulation to the individual claws. This may be achieved as is standard practice by using a pulsator 56 connected to the milking vacuum reticulation pipe 57 or if necessary to another pipe dedicated to handling the pulsation air flows. The pulsation connection to the teat-cups may follow normal practice, as via line 58 to a unit (not shown) integral with the claw.

The present invention provides a means of specific control of the control valve in direct response to the sensing, by suitable sensor means, of the milk on a milk receiving chamber. The sensing means and the specifically controllable control valve provides for definite control of the valve to be achieved.

This control is preferably achieved by a microcomputer based control system. The milking machine and ancillary equipment can thus be placed under the control of the microcomputer system which besides permitting control of the milk valve 23 to take place also allows other functions to be carried out. Normally one microcomputer unit would be used for each claw unit although it is envisaged that a system using one central processor would be possible.

Whilst the primary function of the electronic control 46 is that of sensing, via the sensing means, the milk level in bowl 11 and then operating the milk flow valve 23 to maintain the milk volume within the bowl between determined levels it can as indicated above advantageously carry out secondary functions. For example the central control can achieve control of pulsation dependent on approximate flow rate sensing from milk valve open times, detect end of milking and actuate automatic cup removal. It also permits control of more accurate integral milk metering such as for example an electromagnetic flowmeter.

Further, for reasons of promoting udder health by withdrawing foremilk prior to the commencement of pulsation, the microcomputer may be programmed to initiate pulsation action only after a particular volume of foremilk has been removed. Removal of foremilk from the teats (which often contain bacteria) before it is displaced into the higher regions of the udder where colonisation may occur, it is advantageous to udder health.

It is considered that the use of a single chip microcomputer system with an integral analogue-digital converter, as the basis of the electronic control system has considerable advantages from both functional and economic viewpoints.

Existing commercial microcomputer devices have the capability to implement the above discussed control functions.

We claim:

1. Apparatus for use in the machine milking of animals comprising a milking receiving chamber connectable to the teat cups of a milking machine and connectable to a milking vacuum source, sensing means associated with said chamber, said sensing means, during milking of an animal, sensing a presence of a volume of milk equal to or greater than a predetermined volume, a milk outlet through which milk from the milk receiving chamber can flow into an evacuated milk transport means, valve means which is operative between open and closed positions to control milk flow through or from said milk outlet and control means for controlling the opening and closing of said valve means, the control means being operative to close the valve means each time said sensing means senses a reduction to said predetermined volume and operative to open said valve means when, following closure of the valve means the milk contained within the chamber has increased to a volume greater than said predetermined volume.

2. Apparatus as claimed in claim 1 wherein the control means includes delay means which establishes a delay between said predetermined volume being sensed and the valve means being opened to allow milk to flow from said chamber.

3. Apparatus as claimed in claim 1 or 2 wherein said valve means is located with the milk outlet.

4. Apparatus as claimed in claim 1 or 2 when incorporated in a claw piece for a milking machine.

5. A teatcup claw as claimed in claim 4 having connections for coupling thereto the short tubes of teatcups and a vacuum inlet, the milk outlet being located in an upper portion of the claw, there being a milk conduit having an inlet located within the milk receiving chamber and communicating with the milk outlet.

6. A teatcup claw as claimed in claim 5 wherein the milk outlet and connections for pulsation and milking vacuum lines are located adjacent one another in an upper portion of the claw.

7. A teatcup claw as claimed in claim 6 wherein the milk conduit is a tubular member located coaxially with a vertically disposed axis of symmetry of the milk receiving chamber.

8. A teatcup claw as claimed in claim 7 wherein vanes or baffles are located adjacent the intake end of the milk conduit to prevent hydrodynamic rotation of outflowing milk approaching said intake end.

9. Apparatus as claimed in claim 2 wherein the delay established by said time delay means is constant.

10. Apparatus as claimed in claim 2 wherein the delay established by said time delay means is dynamically varied in response to variations in the milk flow rate into the milk receiving chamber.

11. Apparatus as claimed in claim 2 wherein said sensing means comprises a plurality of conductors in said chamber, said conductors being configured such that interelectrode conductance varies rapidly as the milk in the chamber reduces to said predetermined volume.

12. Apparatus as claimed in claim 11 wherein the conductors are at least a pair of coaxially mounted metal tubes separated by an insulative medium which has a pair of spaced apart diametrically projecting partitions which terminate short of the wall surface of the chamber to thereby form annular spaces, said conductive tubes each terminating at or adjacent to a respective partition, the milk entry point into the chamber being such that as the chamber fills the annular spaces are successively filled.

13. Apparatus as claimed in claim 12 wherein the partitions are integrally formed with the insulative medium and are outwardly of tapering cross-section.

14. Apparatus as claimed in claim 12 wherein the surface of the outermost conductor tube is covered for a part of its length by an insulative covering.

15. Apparatus as claimed in claim 12 wherein one of said conductive tubes forms an outlet passage from the chamber and said valve means is located between said outlet passage and said milk outlet.

16. Apparatus for machine milking an animal comprising a teat cup cluster coupled to a milk receiving chamber, a milking vacuum means connected via a claw vacuum line to said chamber, said chamber being connected with evacuated milk transport means, said milk transport means being separate from said vacuum milking means, sensing means associated with said chamber said sensing means, during milking of an animal, sensing a presence of a volume of milk equal to or greater than a predetermined volume, a milk outlet through which milk from the milk receiving chamber can flow into a milk transport means, valve means which is operative between open and closed positions to control milk flow through or from said milk outlet and control means for controlling the opening and closing of said valve means, the control means being operative to close the valve means each time said sensing means senses a reduction to said predetermined volume and operative to open said valve means when, following closure of the valve means the milk contained within the chamber has increased to a volume greater than said predetermined volume.

17. Apparatus as claimed in claim 16 further including waste milk collection means coupled into the claw vacuum line, the control means being operable to hold closed said valve means such that milk entering said chamber is caused to flow in said claw vacuum line and collect in said waste milk collection means.

18. Apparatus as claimed in claims 16 or 17 wherein said control means includes pulsation control means which prevents the teatcup liners from being collapsed when said valve means is open to allow milk to flow from said chamber.

19. Apparatus as claimed in claim 16 further including means for connecting said milk transport means to said claw vacuum line and coupling washing fluid supply to said claw vacuum line.

* * * * *